United States Patent
Krimmel et al.

(10) Patent No.: US 6,320,878 B1
(45) Date of Patent: Nov. 20, 2001

(54) ACTIVE DEMARCATION POINT OF AN ACCESS NETWORK

(75) Inventors: Heinz Krimmel; Rainer Fritschi, both of Korntal-Münchingen; Rolf Heidemann, Tamm, all of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 08/971,971

(22) Filed: Nov. 17, 1997

(30) Foreign Application Priority Data

Nov. 20, 1996 (DE) .............................................. 196 47 944

(51) Int. Cl.$^7$ ....................................................... H04J 1/02
(52) U.S. Cl. ................................................................ 370/488
(58) Field of Search ..................................... 370/480, 481, 370/485, 486, 487, 488, 489, 490, 496, 497, 484

(56) References Cited

U.S. PATENT DOCUMENTS

| | | |
|---|---|---|
| 4,928,272 | 5/1990 | Ohue . |
| 4,982,440 | 1/1991 | Dufresne et al. . |
| 5,010,399 | * 4/1991 | Goodman et al. ..................... 358/85 |
| 5,790,548 | * 8/1998 | Sistanizadeh et al. ............... 370/401 |
| 5,905,726 | * 5/1999 | Gupta .................... 370/390 |
| 5,917,830 | * 6/1999 | Chen et al. .......................... 370/487 |
| 5,991,271 | * 11/1999 | Jones et al. .......................... 370/252 |

FOREIGN PATENT DOCUMENTS

| | | |
|---|---|---|
| 3232599 | 5/1984 | (DE) . |
| 269509 | 6/1989 | (DE) . |
| 3913207 | 11/1989 | (DE) . |
| 19508394 | 9/1996 | (DE) . |
| 0239908 | 10/1987 | (EP) . |
| 0549129 | 6/1993 | (EP) . |

OTHER PUBLICATIONS

Siedel et al, "Wirtschaftlicher Zugang zum UISDN", In: telecom report 12, 1989 H. 1–2, pp. 14–17.

Klappe et al, "Einheitliche Chips für den ISDN–Basisanschlu,β". In: telecom report 12, 1989, H. 1–2, S.40–43.

Brandstatter, Rupert u.a., : "Die UP↓ O ↑–Schnitt–stelle". In. ntz, Bd 41, 1988, H. 12, S. 696–699.

"Ton–und Fernsehübertragungstechnik und Technik leitungsgebundener BK —Anlagen" Decker's Verlag, G. Schenck, Heidelberg, 1988, p. 294.

* cited by examiner

*Primary Examiner*—Kwang B. Yao
(74) *Attorney, Agent, or Firm*—Ware, Fressola, Van Der Sluys & Adolphson LLP

(57) ABSTRACT

In a hybrid fiber/coax access network (NET) with downstream and upstream channels, the upstream channel serves to transmit voice and video signals as well as data signals from groups of customer locations (END) to a subcenter (HUB). A demarcation point (UP) provides the interface between the access network (NET) and the private network of the customer location (END). It contains at least two devices (BP4, BP5, BP6) for frequency-splitting received signals in the upstream frequency band, at least two switches (S4, S5, S6) following the at least two devices (BP4, BP5, BP6) and serving to block or unblock individual upstream frequency ranges, a measuring unit (MESS2) for measuring the amplitudes or intensities of the signals in the split frequency ranges, and a control unit (CTRL) for evaluating the measured values and controlling the at least two switches (S4, S5, S6). For a customer location (END), individual upstream frequency ranges can thus be telemetrically blocked for a limited time. Decentralized and autonomous monitoring of individual upstream frequency ranges is accomplished by a measuring unit which is controlled by the demarcation point (UP) itself.

10 Claims, 3 Drawing Sheets

ACTIVE DEMARCATION POINT OF AN ACCESS NETWORK

TECHNICAL FIELD

This invention relates to an active demarcation point of an access network with a downstream channel and an upstream channel for bidirectional signal transmission.

BACKGROUND OF THE INVENTION

An access network is, for example, a coaxial cable network with a downstream (forward) channel and an upstream (return) channel which supports different bidirectional services, such as telephony, data exchange via Internet, or video telephony.

A demarcation point is described in a book entitled "Ton-und Fernsehubertragungstechnik und Technik leitungsgebundener BK-Anlagen", Decker's Verlag, G. Schenck, Heidelberg 1988, page 294. It forms the terminating unit of a public distribution network and thus provides the interface to customer premises equipment. With the demarcation point, the distribution network and an in-home network can be separated from each other for testing purposes or for blocking individual customers. The quality of the signals on the lines from the customer and on the lines from a center is measured. Customer blocking is effected manually, and the entire transmission band is blocked. During the blockage, no signal can be transmitted from the customer to the center.

SUMMARY OF THE INVENTION

It is therefore an object of the invention to provide a demarcation point of an access network which simplifies the blocking and unblocking of a customer.

Another object of the invention is to monitor customer signals during and out of a customer blockage.

These objects are attained by an active demarcation point of an access network with a downstream channel and an upstream channel for bidirectional signal transmission, comprising at least two devices for frequency-splitting received signals in the upstream frequency band; at least two switches connected with the at least two devices and serving to block or unblock individual upstream frequency ranges; a measuring unit for measuring the amplitudes or intensities of the signals in the split frequency ranges; and a control unit for evaluating the measured values and controlling the at least two switches.

A particular advantage of the invention is the decentralized and autonomous monitoring of individual upstream frequency ranges by a measuring unit controlled by the demarcation point itself.

Another advantage of the invention is that for individual customers, individual upstream frequency ranges can be telemetrically blocked for a limited time.

Furthermore, the use of the invention saves time during debugging since continuous-time, independent measurements are performed and evaluated, and decisions are made, at the demarcation point.

The use of the invention also permits telemetric measured-value acquisition and monitoring of the access network as well as traffic-volume-dependent return-channel assignment.

BRIEF DESCRIPTION OF THE DRAWING

The invention will become more apparent from the following description of two embodiments when taken in conjunction with the accompanying drawings, in which.

BEST MODE FOR CARRYING OUT THE INVENTION

Figure 1:
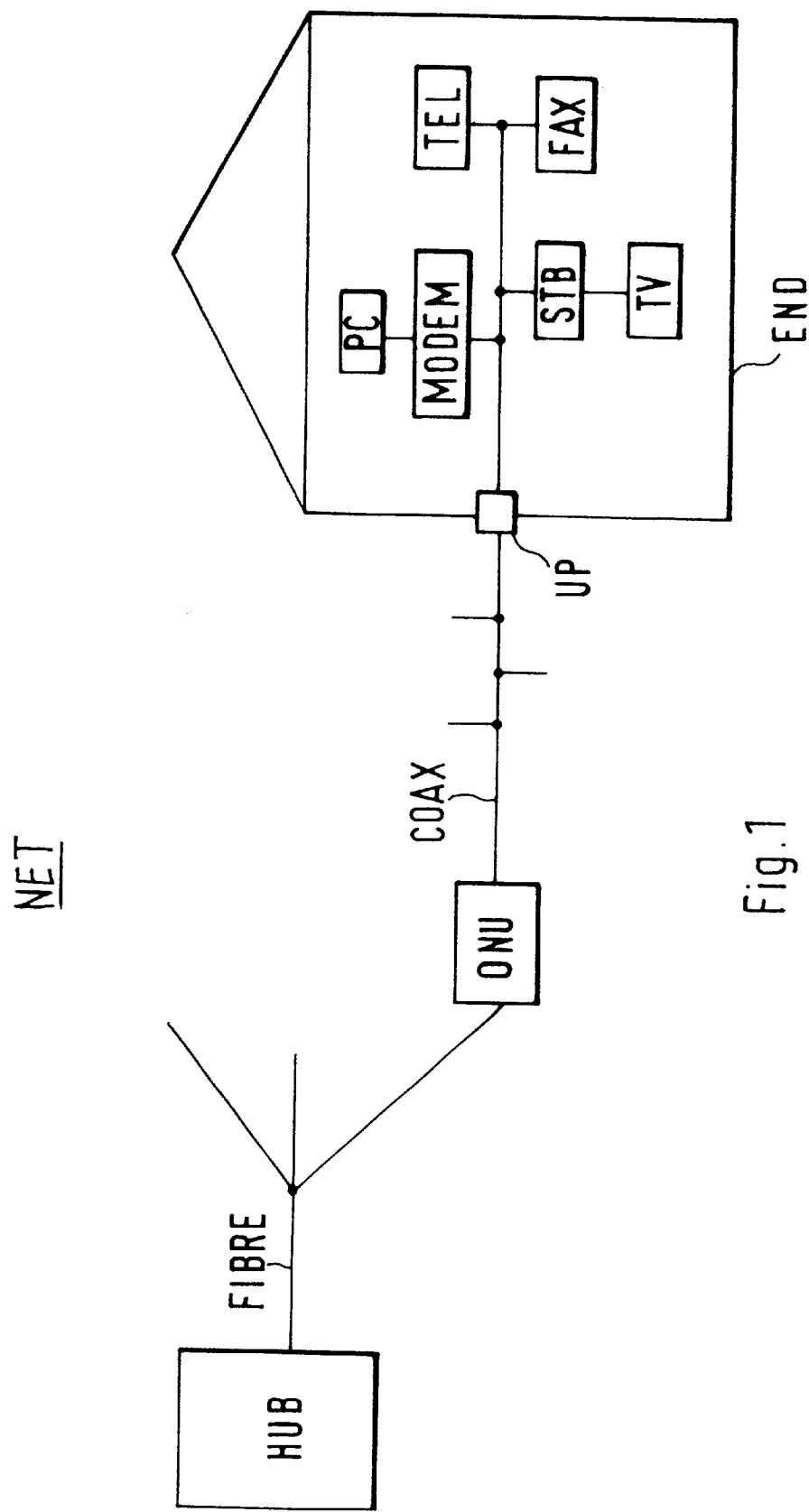
FIG. 1 is a schematic block diagram of an access network according to the invention, with a downstream channel and an upstream channel.

The first embodiment will now be explained with the aid of FIGS. 1 and 2. FIG. 1 shows a hybrid fiber/coax access network NET which serves to transmit, for example, analog and digital television and video signals as well as data signals from a subcenter HUB to a plurality of customer locations with customer premises equipment END, and analog and digital voice and video signals as well as data signals from the customer locations to the subcenter HUB. of the customer locations, one is shown by way of example. At the subcenter HUB, the signals to be transmitted are converted from electrical to optical form, and the optical signals are transmitted over the downstream channel of a distribution network consisting of optical fibers, e.g., glass fibers FIBRE, and optical splitters to a plurality of optical network terminating units ONU, of which one is shown. Each optical network terminating unit ONU converts the received signals from optical to electrical form, and the electric signals are then transmitted over coaxial cables COAX to a plurality of customer locations END.

The video signals are, for example, movies, educational programs, or the like selected by customers in an interactive mode. The selection of the video signals and the transmission of the data signals, e.g., for Internet access, takes place via the upstream channel, which occupies the band 5–30 MHz, for example.

Between customer premises equipment END and coaxial cable COAX, a demarcation point UP is provided. The demarcation point UP provides the interface between the access network NET of a network operator and the customer premises equipment END. Its function is to monitor signals transmitted by the customer premises equipment and, in the event of a failure caused by, for example, a continuous signal of a terminal, block the upstream frequency band or subdivisions thereof. The monitoring and blocking functions for the upstream channel are provided by decentralized and autonomous equipment, namely by a measuring unit controlled by the demarcation point itself, a control unit, a number of switches, and devices for splitting the upstream frequency band. Measurements are performed continuously, e.g., periodically every second. Evaluation of the measurements and decision-making take place at the demarcation point. Furthermore, control signals transmitted by the subcenter HUB can be received at the demarcation point UP and, in response thereto, the downstream frequency band or parts thereof and the upstream frequency band or parts thereof can be blocked, for example in case of an unauthorized access by the customer due to nonpayment of charges. To accomplish this, the demarcation point UP includes a transmitting/receiving unit which receives the control signals and passes them on to the control unit. The transmitting/receiving unit can also transmit the currently blocked and unblocked frequency ranges, both those of the downstream channel and those of the upstream channel, to the subcenter HUB in order to inform the latter of the current status, so that it has a picture of the entire access network and/or can make changes if necessary.

The customer premises equipment END has a separate in-home network which can be accessed by the customer and to which the customer can connect many terminals. The terminals are, for example, a computer PC attached via a modem MODEM, a television set TV attached via a set-top box STB, a telephone TEL, and a fax unit FAX.

Figure 2:
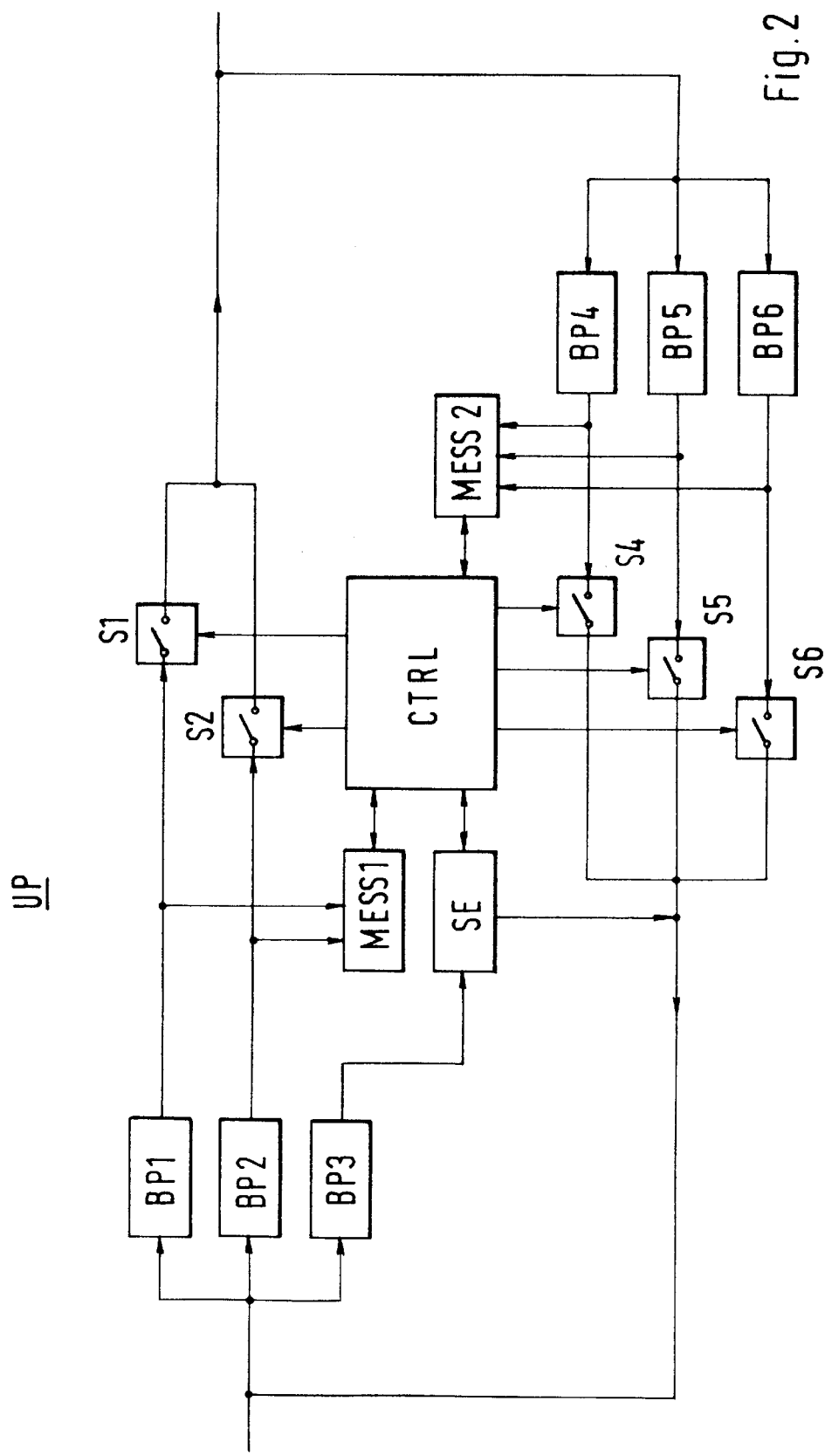
FIG. 2 is a schematic block diagram of an active demarcation point according to the invention for the access network of FIG. 1.

FIG. 2 shows a demarcation point UP according to the invention for the access network NET of FIG. 1. The demarcation point UP contains at least two devices BP4, BP5, BP6 for frequency-splitting received signals in the upstream frequency band, at least two switches S4, S5, S6 following the at least two devices BP4, BP5, BP6 and serving to block or unblock individual upstream frequency ranges, a measuring unit MESS2 for measuring the amplitudes or intensities of the signals in the split frequency ranges, and a control unit CTRL for evaluating the measured values and controlling at least two switches S4, S5, S6.

In the first embodiment, the at least two devices BP4, BP5, BP6 are three bandpass filters with different passbands; for example, the passband of bandpass filter BP4 is the band 5–10 MHz, the passband of bandpass filter BP5 is the band 10–20 MHz, and the passband of the bandpass filter BP6 is the band 20–30 MHz. Instead of the bandpass filters BP4, BP5, BP6, diplexers or demultiplexers, for example, may be used.

In the first embodiment, the at least two switches S4, S5, S6 are three electric switches S4, S5, S6, which are constructed from bistable coaxial relays or semiconductor devices, for example.

The measuring unit MESS2 has one input for each split upstream frequency range. Each of the inputs is connected to the output of a respective one of the bandpass filters. The measuring unit MESS2 contains, for example, three amplitude detectors or three intensity detectors which determine the amplitudes or intensities, respectively, of the signals in the individual upstream frequency ranges. The measured values are present in analog form, for example. To digitize the measured values, the measuring unit MESS2 includes an analog-to-digital converter and a memory, for example. The measured values are temporarily stored in the memory, then digitized in the analog-to-digital converter using time-division multiplexing, and subsequently fed to the control unit CTRL. To convert the measured values, the measuring unit MESS2 may also include three analog-to-digital converters, so that the measured values are digitizable synchronously and transferrable to the control unit CTRL in parallel.

The control unit CTRL contains a memory for storing desired values and a digital signal processor or a microprocessor for comparing the measured, digitized values with the stored desired values. The desired values constitute, for example, a minimum threshold, below which the received signals must not drop, and a maximum threshold, above which the received signals must not rise. If the signal of a terminal, e.g., that of the set-top box STB, lies above the threshold due to a malfunction in the terminals, the control unit CTRL will cause the upstream frequency range in which the set-top box STB is transmitting to be blocked by operating the respective switch S4, S5, S6. The frequency range which is not disturbed by the set-top box STB will remain unblocked, so that telephone calls, for example, can still be made from the customer location END.

The active demarcation point UP further includes a transmitting/receiving unit SE for transmitting current settings of the at least two switches S4, S5, S6. The transmitting/receiving unit SE thus transmits the currently blocked and unblocked upstream frequency ranges to the subcenter HUB. To this end, the transmitting/receiving unit SE contains a modulator which generates a carrier frequency that lies within the upstream frequency band and is not yet occupied by the signals of the customer premises equipment, a memory for storing the address of the active demarcation point UP, and an encoder for encoding the address and the current settings. The encoding is done by pulse-code modulation, for example. Each demarcation point UP of the access network NET thus transmits its current settings in the form of messages to the subcenter HUB, e.g., by the polling technique.

The transmitting/receiving unit SE further serves to receive remote control settings for the at least two switches S4, S5, S6. The remote control settings are transmitted from the subcenter to the active demarcation points UP via the access network NET. They are determined, for example, by monitoring the charge payments by the customers. If a customer does not pay charges for a particular service, such as the interactive video-on-demand service, the corresponding frequency range will be blocked.

The control unit CTRL further includes a respective comparator for each switch S4, S5, S6, for selecting a switch position based on the remote control setting received from the transmitting/receiving unit SE and the result of the evaluation of the measured value for the respective switch S4, S5, S6. The comparator is an AND gate with two inputs and one output, for example. One of the inputs is fed with the received remote control setting for the respective switch 54, S5, S6, and the other with the results of the evaluation of the measured values. The output of the AND gate is coupled to the control input of the respective switch S4, S5, S6. A selection is thus made between the received settings and the settings determined from the measurement. If one of the settings signifies "block", the respective switch will be opened, thus blocking the respective frequency range. If both settings signify "block", the respective switch will also be opened. Only if both settings signify "unblock" will the respective switch be closed, thus passing the corresponding frequency range.

The active demarcation point UP includes at least two further devices BP1, BP2, BP3 for frequency-splitting received signals in the downstream frequency band, at least two further switches S1, S2 following the at least two further devices BP1, BP2, BP3 and serving to block or unblock individual downstream frequency ranges, and a further measuring unit MESS1 for measuring the amplitudes or intensities of the signals in the split downstream frequency ranges.

In the embodiment, the at least two further devices BP1, BP2, BP3 are three bandpass filters with different passbands. For example, the passband of bandpass filter BP3 is 45–60 MHz, that of bandpass filter BP2 is 100–450 MHz, and that of bandpass filter BP1 is 450–800 MHz. Instead of the bandpass filters BP3, BP2, BP1, diplexers or demultiplexers can be used, for example. The passband of bandpass filter BP3 serves to transmit control signals, for example; the passband of bandpass filter BP2 serves to transmit analog television signals, for example; and the passband of bandpass filter BP1 serves to transmit digital television signals and data, for example.

The control unit CTRL further serves to evaluate the values measured in the further measuring unit MESS1 and to control the at least two switches S1, S2.

The further switches S1, S2 correspond in design and operation to the switches S4, S5, S6, but in relation to the downstream channel and not the upstream channel.

The further measuring unit MESS1 corresponds in design and operation to the measuring unit MESS2, but in relation to the downstream channel and not the upstream channel.

The transmitting/receiving unit SE, besides receiving remote control settings for the upstream channel, also receives remote control settings for the at least two further switches S1, S2. The remote control settings are transmitted from the subcenter to the active demarcation points UP via the access network NET. The selection between the received settings and the settings determined from the measurement can be made in a manner analogous to that for the upstream channel, i.e., via an AND gate.

Figure 3:
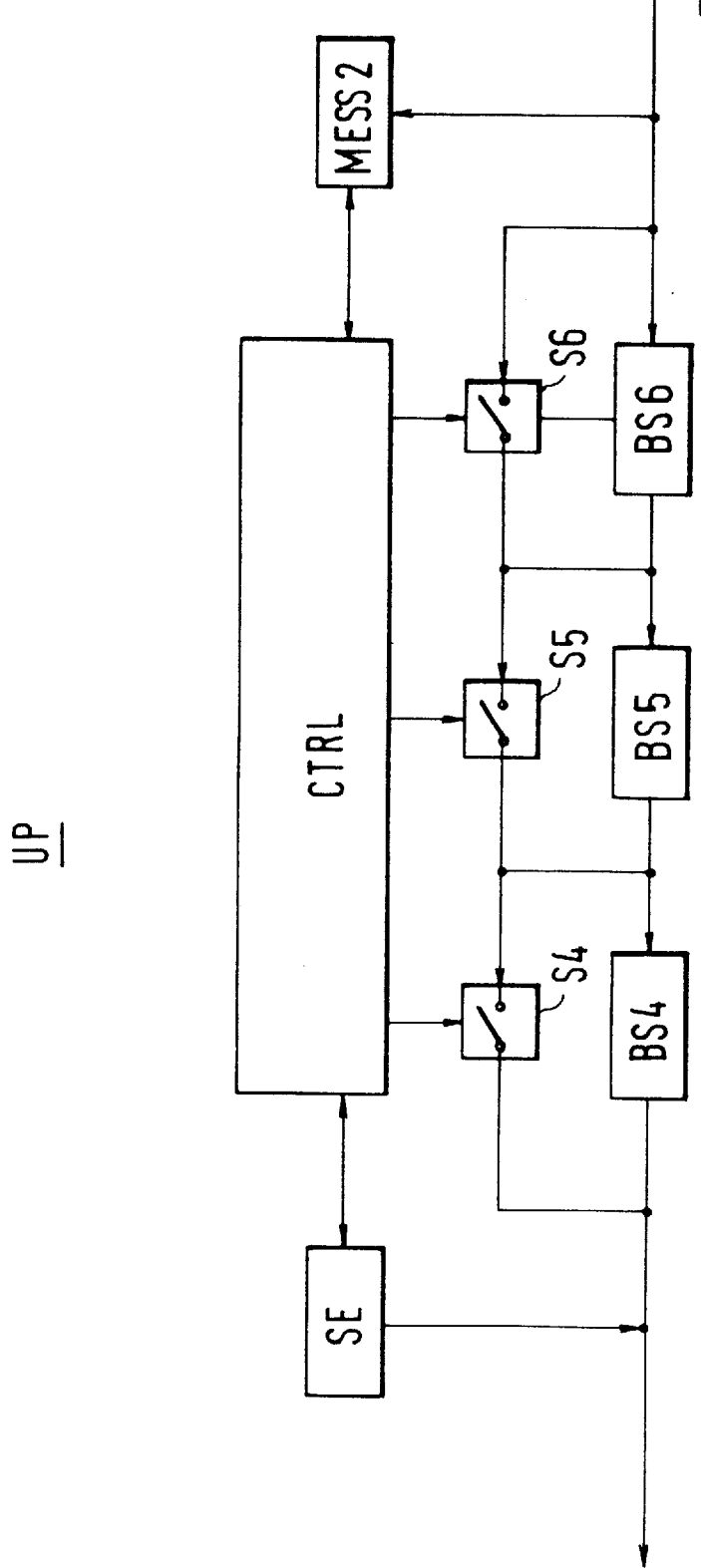
FIG. 3 is a schematic block diagram of another active demarcation point according to the invention for the access network of FIG. 1.

The second embodiment will now be explained with the aid of FIG. 3. FIG. 3 shows a demarcation point UP according to the invention for the access network NET of FIG. 1. The demarcation point UP includes a control unit CTRL, a measuring unit MESS2, and a transmitting/receiving unit SE, which perform essentially the same functions as the corresponding elements of FIG. 2 regarding the signal transmission in the upstream channel. The demarcation point UP further includes two devices BS4, BS5, BS6 for frequency-splitting received signals in the upstream frequency band and at least two switches S4, S5, S6 for blocking or unblocking individual frequency ranges.

In the second embodiment, the at least two devices BS4, BS5, BS6 are three bandstop filters with different stopbands; for example, the stopband of bandstop filter BS4 is 5–10 MHz, the stopband of bandstop filter BS5 is 10–20 MHz, and the stopband of bandstop filter BS6 is 20–30 MHz.

The at least two switches S4, S5, S6 in the second embodiment are three electric switches S4, S5, S6, which are constructed from bistable coaxial relays or semiconductor devices, for example.

The three bandstop filters BS4, BS5, BS6 with the three switches S4, S5, S6 can be used alternatively to the bandpass filters of FIG. 2. The parallel connection of the bandpass filters with their subsequent switches is replaced by a series connection of the bandstop filters BS4, BS5, BS6 with parallel-connected switches S4, S5, S6. In this manner, both circuit variants perform the same function. The bandstop filters BS4, BS5, BS6 block the unwanted frequency ranges, and the bandpass filters pass the wanted frequency ranges. If the bandstop filters BS4, BS5, BS6 are used, all switches must therefore be closed to unblock the entire upstream frequency band. If the frequency ranges 5–20 MHz are to be blocked, the switches S4 and S5 must be opened and the switch S6 must be closed.

The measuring unit MESS2 contains, for example, a tuner with an adjustable frequency range or a spectrum analyzer which measures the amplitudes and/or intensities of the signals throughout the upstream frequency band.

The replacement of the bandpass filters by the bandstop filters is shown only for the upstream channel. In similar fashion, bandpass filters for the downstream channel can be replaced by bandstop filters. All embodiments and variants of the demarcation point of FIG. 2 can also be applied to the demarcation point UP of FIG. 3.

In the first embodiment, a hybrid access network NET was described. Instead of being used in a hybrid access network NET, the invention can also be employed in an all-electric or all-optical access network. The demarcation point UP for an all-optical access network contains, for example, wavelength-dependent couplers or optical filters instead of bandpass filters BP1–BP6 for frequency-splitting signals in the upstream frequency band and electrically controllable optical switches instead of electric switches S1, S2, S4-S6 for blocking or unblocking individual upstream frequency ranges. Each measuring unit MESS1, MESS2 then contains, for example, a photodiode for determining the intensities of the signals in the upstream frequency band. The control unit CTRL may again contain a digital signal processor.

What is claimed is:

1. An active demarcation point (UP) of an access network (NET) having a single downstream channel and a single upstream channel for bidirectional signal transmission, comprising:

at least two devices (BP4, BP5, BP6, BS4, BS5, BS6) for frequency-splitting received signals in the single upstream channel;

at least two switches (S4, S5, S6) connected with the at least two devices (BP4, BP5, BP6, BS4, BS5, BS6) and serving to block or unblock individual upstream frequency ranges;

a measuring unit (MESS2) for measuring the amplitudes or intensities of the frequency-split received signals in the individual upstream frequency ranges; and a control unit (CTRL) for evaluating the measured amplitude or intensity values and controlling the at least two switches (S4, S5, S6), wherein the active demarcation point (UP) provides an interface between the access network (NET) and customer premises equipment (END), wherein the active demarcation point (UP) is between the customer premises equipment (END) and a cable (COAX), and wherein the customer premises equipment (END) comprises at least two terminal types selected from the group consisting of a computer (PC) attached via a modem (MODEM), a television set (TV) attached via a set-top box (STB), a telephone (TEL), and a fax unit (FAX).

2. An active demarcation point (UP) as claimed in claim 1, characterized in that it comprises a transmitting/receiving unit (SE) for transmitting current settings of the at least two switches (S4, S5, S6).

3. An active demarcation point (UP) as claimed in claim 1, characterized in that it comprises a transmitting/receiving unit (SE) for receiving remote control settings for the at least two switches (S4, S5, S6).

4. An active demarcation point (UP) as claimed in claim 3, characterized in that for each of the switches (S4, S5, S6), the control unit (CTRL) comprises a respective comparator for selecting a switch position based on the remote control setting received from the transmitting/receiving unit (SE) and the result of the evaluation of the measured value for the respective switch (S4, S5, S6).

5. An active demarcation point (UP) as claimed in claim 1, characterized in that it comprises at least two further devices (BP1, BP2, BP3) for frequency-splitting received signals in the downstream frequency band, at least two further switches (S1, S2) following the at least two further devices (BP1, BP2, BP3) and serving to block or unblock individual downstream frequency ranges, and a further measuring unit (MESS1) for measuring the amplitudes or intensities of the signals in the split downstream frequency ranges, and that the control unit (CTRL) serves to evaluate the values measured in the further measuring unit (MESS1) and to control the at least two further switches (S1, S2).

6. An active demarcation point (UP) as claimed in claim 5, characterized in that the transmitting/receiving unit (SE) serves to receive remote control settings for the at least two further switches (S1, S2).

7. An active demarcation point (UP) as claimed in claim 1, characterized in that the at least two devices (BP4, BP5, BP6, BS4, BS5, BS6) are bandpass filters (BP4, BP5, BP6) with different passbands, and that a respective one of the switches (S4, S5, S6) and a respective one of the bandpass filters (BP4, BP5, BP6) are connected in series.

8. An active demarcation point (UP) as claimed in claim 1, characterized in that the at least two devices (BP4, BP5, BP6, BS4, BSS, BS6) are bandstop filters (BS4, BS5, BS6) with different stopbands, and that a respective one of the switches (S4, S5, S6) and a respective one of the bandstop filters (BS4, BS5, BS6) are connected in parallel.

9. An active demarcation point (UP) as claimed in claim 1, characterized in that the measuring unit (MESS2) comprises at least one analog-to-digital converter for converting the measured values, and that the control unit (CTRL) comprises a memory for storing desired values and a digital signal processor for comparing the measured, digitized values with the stored desired values.

10. The active demarcation point (UP) of claim 1, wherein the single downstream channel and the single upstream channel are each located on both sides of the active demarcation point.

* * * * *

UNITED STATES PATENT AND TRADEMARK OFFICE
CERTIFICATE OF CORRECTION

PATENT NO. : 6,320,878 B1
DATED : November 20, 2001
INVENTOR(S) : Krimmel et al.

It is certified that error appears in the above-identified patent and that said Letters Patent is hereby corrected as shown below:

Column 7,
Line 9, in the third line of Claim 8, please delete "BSS" and substitute therefor -- BS5 --.

Signed and Sealed this

Twelfth Day of March, 2002

Attest:

Attesting Officer

JAMES E. ROGAN
Director of the United States Patent and Trademark Office